3,322,622
METHODS FOR CONTROLLING INSECTS WITH
TRICYCLIC KETONES
Paul E. Hoch, Youngstown, N.Y., assignor to Hooker Chemical Corporation, Niagara Falls, N.Y., a corporation of New York
No Drawing. Filed Nov. 26, 1965, Ser. No. 510,072
12 Claims. (Cl. 167—33)

This is a continuation-in-part of application Serial No. 327,519, filed December 2, 1963.

This invention relates to methods for controlling pests with certain tricyclic ketones.

The tricyclic ketones employed in this invention are those represented by the formula

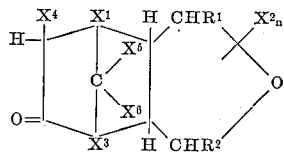

wherein $X^1$, $X^3$, $X^5$, and $X^6$ are independently selected from the group consisting of hydrogen, halogen, alkyl, alkenyl, halogenated alkyl, and halogenated alkenyl; $X^4$ is selected from the group consisting of hydrogen and halogen; $X^2$ is a halogen atom; $R^1$ and $R^2$ are independently selected from the group consisting of hydrogen, alkyl, and halogenated alkyl; and $n$ is a number from 0 to about 4; at least two of said $X^1$, $X^3$, $X^5$, and $X^6$ substituents being halogen.

Illustrative examples of the alkyl substituents, which usually contain from 1 to about 18 carbon atoms, and preferably from 1 to about 6 carbon atoms, are methyl, ethyl, propyl, isopropyl, butyl, isobutyl, amyl, hexyl, cyclohexyl, heptyl, octyl, nonyl, dodecyl, pentadecyl, stearyl, octadecyl and the like, said alkyl group being a monovalent radical derivable from an aliphatic hydrocarbon by the removal of one hydrogen atom. The alkyl radical can be substituted by halogen, such as chlorine, bromine, fluorine, or iodine, as in chloromethyl, dichloromethyl, trichloromethyl, trifluoromethyl, bromoethyl, chloroethyl, fluoropropyl, hexachloroisopropyl, chlorobutyl, bromobutyl, chlorocyclohexyl, iodopropyl, bromooctyl, chlorooctyl, chlorodecyl, iododecyl, chlorododecyl, bromododecyl, bromopentadecyl, iodooctyl and the like.

Among the alkenyl substituents which usually contain from 1 to about 18 carbon atoms and preferably, from 1 to about 6 carbon atoms, are vinyl, allyl, butenyl, hexenyl, octenyl, dodecenyl, and the like, said alkenyl being a radical derivable from an alkene by the removal of one hydrogen atom. The alkenyl radical can be substituted by halogen, such as in trichlorovinyl, 2-chloroallyl, 2,3-difluorobutenyl, 2,3-dichlorododecenyl and the like.

The substituting halogen atoms which are useful include chlorine, bromine, fluorine, and iodine, and the halogenated alkyl or alkenyl radical may bear from one halogen up to a number corresponding to perhalogenation.

The substituent—$X^2{}_n$, as represented, is written with the bond unattached to any particular carbon atom to indicate that the $n$ halogen atoms $X^2$, may be located on any of the substitutable positions, in place of hydrogen atoms. Substitutable position is being employed herein to mean any carbon atom in the generic formula which, if $n$ were zero, would bear one or more hydrogen atoms.

When $n$ is other than zero, the compounds of the invention are prepared by a process involving a substitutive halogenation step (described in more detail hereinafter) which introduces the $n$ halogen atoms into the various available substitutable position. It will be seen that, in formulas given, $n$ hydrogens will be shown for the sake of clarity, although they are replaced by $X^2$ substituents. This is done because, to remove the hydrogens would specify the place of substitution, which may not be intended.

The present invention encompasses mixtures which result from the introduction of $n$ halogen atoms $X^2$ into the available substitutable positions. Such mixtures represent the most economical and commercial products. In these mixtures $n$ generally represents an average value and in some instances these mixtures may contain components with more than $n$ halogen atoms. Although the mixtures are complex, pure isomers have been separated therefrom, as will be more fully described subsequently.

The preferred compounds for insecticidal activity and ease of preparation, are those wherein the $X^1$, $X^2$, $X^3$, $X^4$, $X^5$, and $X^6$ substituents are chlorine or bromine, $R^1$ and $R^2$ are hydrogen and $n$ is a number from 0 to about 3. Even more preferred are those compounds of the preferred group wherein the halogen is chlorine.

Some of the novel compounds embraced within the present invention are, for example:

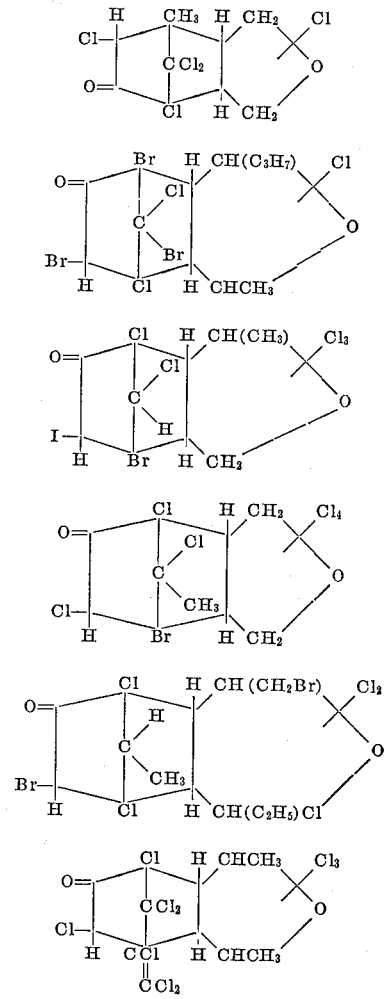

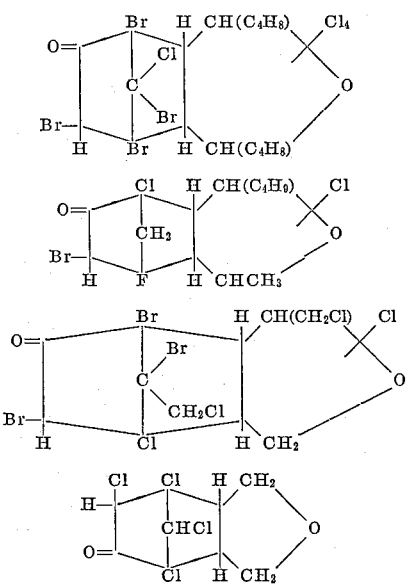

Examples of compounds within the preferred group are the following:

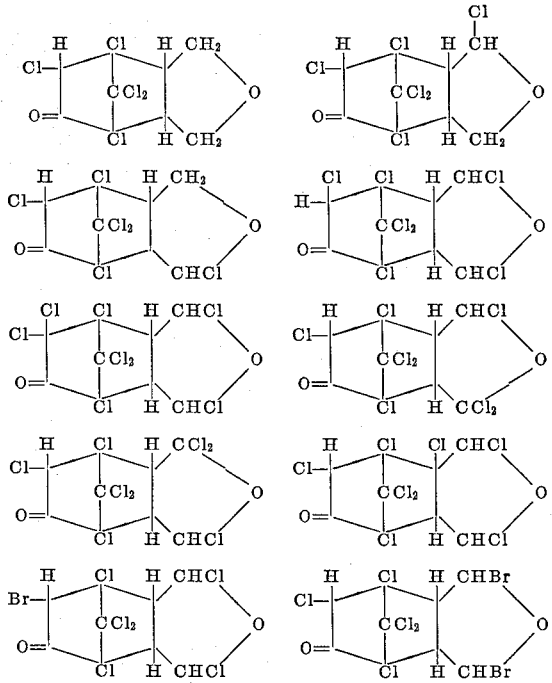

Since each of these compounds contains at least one asymmetric carbon atom, each can exist in more than one stereoisomeric form. The products of the invention are generally mixtures of stereoisomers, which, in some instances, can be separated but in other instances resist separation. This invention includes both mixtures and separable isomers. Interconversion, equilibration, or epimerization of various of the stereoisomers, when they are dissolved in ionizing solvents, has been observed, making it more desirable to deal with the products as mixtures rather than as separated isomers.

The novel carbonyl compounds of the invention can be prepared from polyhalogen-containing tricyclic compounds, disclosed in copending application Serial No. 413,947, filed November 25, 1964. The reaction can be illustrated by the following sequence of equations which are not intended to be limiting.

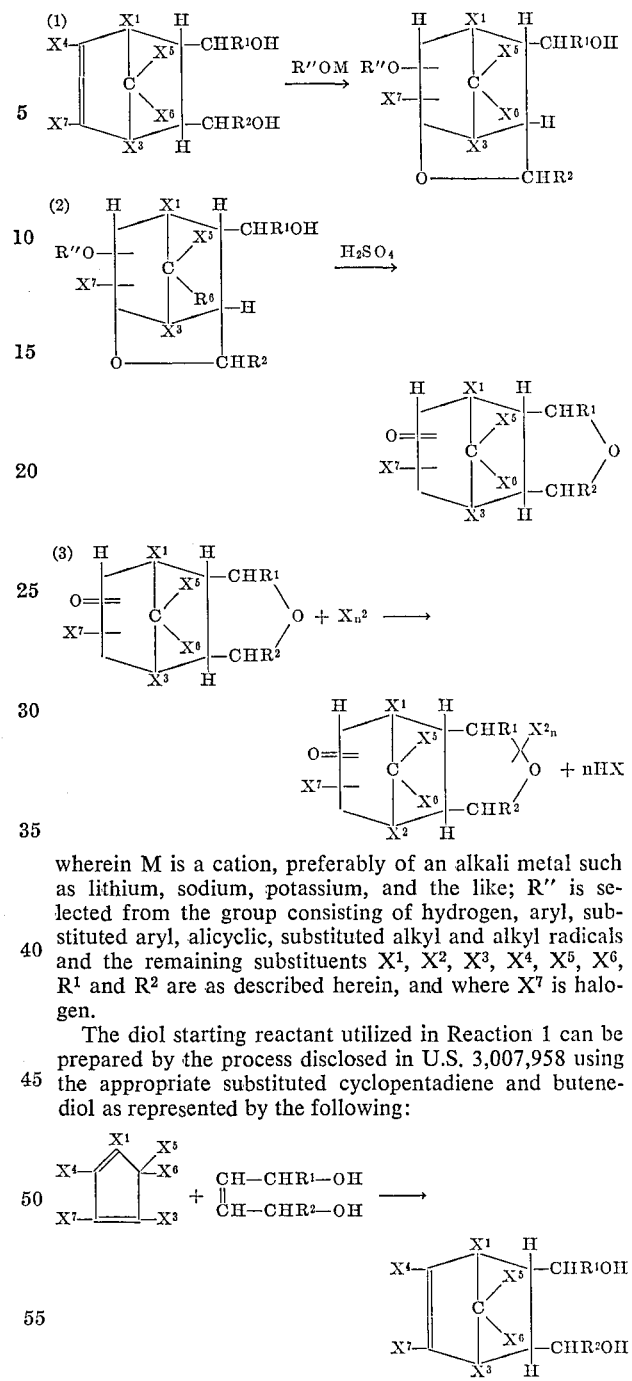

wherein M is a cation, preferably of an alkali metal such as lithium, sodium, potassium, and the like; R″ is selected from the group consisting of hydrogen, aryl, substituted aryl, alicyclic, substituted alkyl and alkyl radicals and the remaining substituents $X^1$, $X^2$, $X^3$, $X^4$, $X^5$, $X^6$, $R^1$ and $R^2$ are as described herein, and where $X^7$ is halogen.

The diol starting reactant utilized in Reaction 1 can be prepared by the process disclosed in U.S. 3,007,958 using the appropriate substituted cyclopentadiene and butenediol as represented by the following:

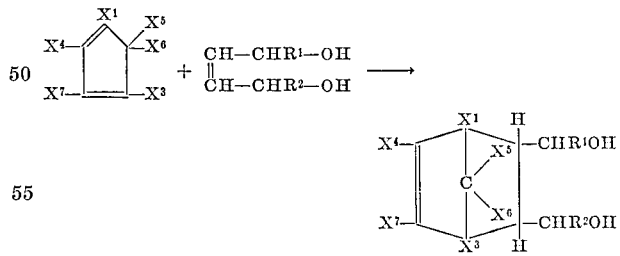

Suitable cyclopentadienes include, for example
1, 2, 3, 4, 5-pentachlorocyclopentadiene,
1, 2, 3, 4, 5-pentachlorocyclopentadiene,
tetrachlorocyclopentadiene,
1, 2, 3, 4-tetrachloro-5,5-dibromocyclopentadiene,
trichloromethylpentachlorocyclopentadiene,
trichlorovinylpentachlorocyclopentadiene,
butenylpentachlorocyclopentadiene, and the like. Among the diols are for example 2-butene-1, 4-diol (preferably cis), 3-hexene-2,5-diol, 8-hexadecene-7,10-diol, 1,4-cyclohexyl-2-butene 1,4-diol and the like. The reaction conditions for effecting this reaction are essentially those described in U.S. 3,007,958.

Reaction 1 is accomplished by contacting the indicated bicyclic diol with a strong base in an alcohol or an aqueous alcohol medium. The base to be selected is capable of forming the alkoxide of the alcohol, such as the sodium, potassium alkoxide, or the like. If desired, the alkoxide reactant can be prepared prior to its addition to the diol.

Because the R" substituent is removed by Reaction 2 the nature of R" is not particularly important. However R" will generally be an alkyl radical from 1 to about 20 carbon atoms and preferably of from 1 to about 6 carbon atoms such as methyl, ethyl, propyl, 2-hydroxyethyl, and the like.

R" can also be hydrogen, this being accomplished either by conducting Reaction 1 in a solvent system containing sufficient water, or by gentle acid hydrolysis of the corresponding compounds where R" is alkyl. By gentle acid hydrolysis is meant the exposure of the product where R" is alkyl, to a mineral acid such as sulfuric acid at a lower concentration, lower temperature, and/or shorter time than is required for Reaction 2 to occur. The compounds where R" is hydrogen may be used as intermediates in Reaction 2.

However, R" may also be substituted alkyl of from one to about twenty carbon atoms and preferably of from one to about six carbon atoms, said alkyl group being substituted by halogen, like chlorine, bromine, fluorine, iodine, hydroxyl, alkyl, and aryl; aryl of from six to about fourteen carbon atoms and preferably of from six to ten carbon atoms, such as phenyl, napthyl, anthracyl, and the like; substituted aryl of from six to about fourteen carbon atoms and preferably of from six to about ten carbon atoms, said aryl group being substituted by halogen, hydroxyl, alkyl, substituted alkyl and the like; and, alicyclic of from one to about twelve carbon atoms and preferably of from one to about six carbon atoms, such as cyclohexyl, cyclopropyl, cyclopentyl, cycloheptyl, cyclooctyl, and the like.

The process of the present invention is represented by Reactions 2 and 3. Reaction 2 is effected preferably in the liquid phase and in the presence of a strong acid, preferably a mineral acid. While an acid-resistant solvent which is miscible with the acid can be used, e.g., nitrobenzene, it is not necessary to use a solvent since the mineral acid itself can perform this solvent function. A preferred mineral acid is concentrated sulfuric acid (preferably 80–100%) which functions as both a solvent and as a catalyst for Reaction 2. Other strong mineral acids such as hydrochloric can also be employed. Reaction 2 is accomplished at a temperature of from about 10 degrees centigrade to about 150 degrees centigrade and preferably from about 40° centigrade to 120° centigrade. Atmospheric pressure is suitable and most convenient, although sub- or super-atmospheric pressures can be employed. The reaction time is from several minutes to several days and preferably from ¼ hour to about 50 hours, depending somewhat on the temperature selected.

The product of Reaction 2 can be isolated by any one of several methods known in this art, such as by diluting the acid medium, when sulfuric acid is used, to cause precipitation, followed by filtration of the product. The product can also be extracted by using an organic solvent which is resistant to acid, such as benzene, aliphatic and aromatic chlorohydrocarbons such as methylene chloride, chloroform, carbon tetrachloride, chlorobenzenes, ethylene dichloride, trichloroethylene, perchloroethylene, nitromethane and the like.

The products of Reaction 2 represents the novel compounds of this invention wherein $n$ is equal to zero. These compounds are useful per se because they possess a substantial degree of pesticidal, especially insecticidal, activity. The compounds are most useful as intermediates for further halogenation to products wherein $n$ is greater than zero. Such halogenated products have high insecticidal activity.

The products of Reaction 2 are often mixtures of stereoisomers probably because of isomerism at the carbon substituted by $X^1$ although we do not wish to be limited by this theory. These mixtures are useful per se but, if desired, can be resolved into their isomer components by fractional crystallization or other means known in the art.

Reaction 3, the halogenation step, is best effected as a direct halogenation when $X^2$ is chlorine. When $X^2$ is other than chlorine, it is most practical to introduce $n$ chlorine atoms and then replace these by the desired halogen, as by exposure of the chlorinated intermediate to an appropriate reagent, for example sodium iodide in acetone, potassium fluoride in dimethyl formamide, hydrogen bromide in glacial acetic acid, or the like.

The chlorination of the products of Reaction 2 is conducted conveniently by passing elemental chlorine or a chlorine-donating reagent, such as sulfuryl chloride, phosphorus pentachloride, an N-chloroamide, or other "positive chlorine" compound into the product of Reaction 2 in a suitable reaction medium.

The temperature for effecting Reaction 3 is from about −40 degrees centigrade to 180 degrees centigrade, and preferably of from about −20 degrees centigrade to 150 degrees centigrade. When the product of Reaction 2 melts low enough, it may be chlorinated without a solvent. Among the solvents which may be used for the chlorination are those organic solvents which are resistant to chlorine, such as carbon tetrachloride, chlorinated benzenes, tetrachloroethane and the like. Other solvents include halogen resistant inorganic liquids such as thionyl chloride or phosphorus oxychloride.

The chlorination reaction can be effected without a catalyst but a free radical catalyst can be utilized for accelerating the reaction. These include actinic light, benzoyl peroxide, or other organic peroxides, azobisisobutyronitrile and the like.

The desired level of chlorination at which the reaction may be halted is detected by methods known in this art such as by measuring the amount of chlorine introduced, noting the change in weight of the product, or by measuring the amount of hydrogen chloride released.

This reaction is conveniently conducted at or near atmospheric pressure, but sub- or super-atmospheric pressures can be used.

To further illustrate the preferred novel compounds and process of this invention, the following specific non-limiting equations are given:

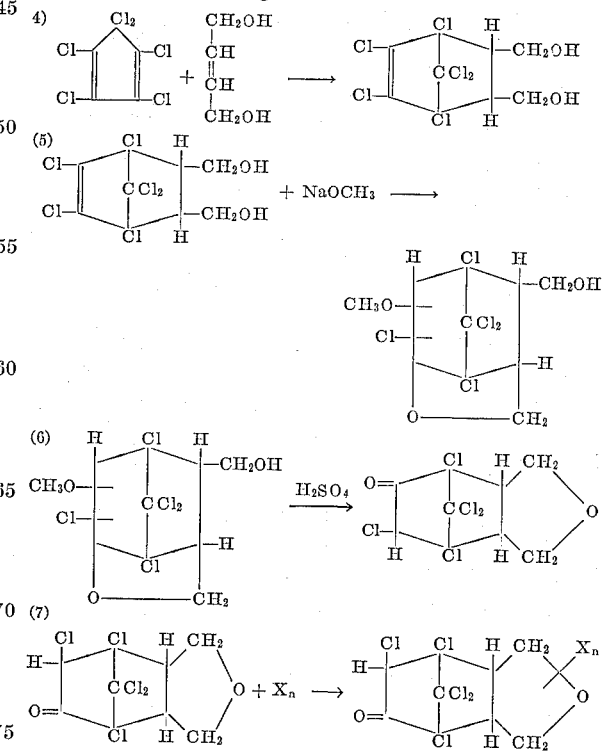

The compounds of this invention are insecticides having a very high level of activity on important insect pests, such as flies, mosquitoes, army worms, corn borers, other lepidopterous larvae, aphids, and other economic invertebrate pests. The compounds of this invention also possess activity against snails, slugs, millipedes, silverfish, and nematodes. Activity of a useful level is also found on rodent pests such as rats, mice, and moles.

An additional advantage of the products of this invention is in the variety of formulations in which they may be utilized for insecticidal use, generally in an amount of 0.5 part to 1000 parts by weight of the compound of this invention to about 1 to 1000 parts by weight of other insecticides. It is, of course, appreciated that various effective amounts of the compounds of this invention can be utilized, and the application rates will often be dependent on the particular circumstances. For example, the purified or crude products may be combined with other biocides or pesticides, including insecticides, such as DDT, methoxychlor, lindane, aldrin, endrin, DDD, BHC, parathion, malathion, methyl parathion, lead arsenate, calcium arsenate, rotenone, allethrin, pyrethrum, nicotine, summer oils, dormant oils, dinitroalkylphenols, dinitrocresols, chlordane, heptachlor, insecticidal carbamates and organophosphates; chlorinated terpenes, demeton, thiophosphates and dithiophosphates such as O,O-dimethyl S-oxo-1,2,3-benzotriazin-3(4H)-ylmethylphosphorodithioate; O,O-diethyl-O(2-isopropyl-6 - methyl-4-pyrimidinyl)phosphorothioate; dimethyl 2,2-dichlorovinyl phosphate; miticides such as bis(pentachlorocyclopentadienyl) chlorinated arylsulfonates, chlorinated diarylsulfones and the like, fungicides such as sulfur, dithiocarbamates and N-trichloromethylthio-4-cyclohexene-1,2-dicarboximide to list but a few. Other insecticides with which the compounds of the invention may be employed are those listed by Kenaga, Bull. Ent. Soc. America, 9, 69 ff (1963).

It may also be desirable to combine the insecticidal products of this invention with a class of potentiators or synergists known in the insecticidal art as "knockdown agents," although against most insects the compounds of the present invention possess an excellent rate of action by themselves. Among the large number of synergists and "knockdown agents" which may be used for this purpose are the organic thiocyanates and others listed by Kenaga (loc. cit., pp. 69, 70, 92). Other adjuvants useful with the compounds of the invention include odorants, colorants, stabilizers, and extending agents (vapor pressure depressants and non-volatile solvent substances such as chlorinated waxes, resins, and the like).

Another advantage of the inventive compositions is that they may readily be formulated as solids or liquids using solid or liquid solvent vehicles, carriers, or extenders. Suitable diluents are solids or liquids of an inert nature. Illustrative solid diluents include among many others: sawdust, vermiculite, clay, talcs, flours, silicas, alkaline earth carbonates, oxides and phosphates, solid fertilizer, and the like. Suitable solvents for liquid formulations include ketones, aromatic and aliphatic hydrocarbons and petroleum fractions or distillates such as xylenes, aromatic naphthas, and the like.

Whether dissolved or dispersed, suspended or emulsified in a liquid or formulated as a dust or powder or some other solid preparation the insecticides of this invention may advantageously contain one or more substances known or referred to variously as modifiers, wetting agents, or surface-active agents. Suitable agents are alkylaryl sulfonates, polyoxyethylene polyol ethers and esters, and the like.

The compounds of the invention can also be formulated in bait compositions, for example with fatty, sugary, or proteinaceous ingestible bait substances.

For controlling pests the compounds of the present invention are applied in insecticidal quantities or effective amounts onto the site of the existing or anticipated harmful pests. Effective insecticidal concentrations are in the range of from about 0.01 pound per acre to about 20 pounds per acre. In most crop applications rates of 0.05 to 5 pounds per acre are employed. Lower rates are used on very susceptible species, such as mosquito larvae, while higher rates are used on extremely resistant species. Higher rates than 20 pounds per acre may be used where economics permit.

The rate to be used will depend on many variables such as the insect species, duration of control desired, weather, soil type, crop species, timing between application and harvest, economics and other factors known to one of skill in this art. The application of the insecticide may be to the crop itself or to the soil in which it is grown.

In the specification, examples and claims, parts are by weight and temperatures are in degrees centigrade, unless otherwise indicated.

In order that those skilled in the art may better understand the present invention and the manner in which it may be practiced, tthe following illustrative examples are given.

Example 1

A solution of 400 parts of sodium hydroxide in 2500 parts of methyl alcohol was heated to reflux with stirring, and 800 parts of 5,6-di(hydroxymethyl)-1,2,3,4,7,7-hexachlorobicyclo[2.2.1]hept-2-ene (the Diels-Alder adduct of cis-2-butene-1,4-diol and hexachlorocyclopentadiene) were added over a two hour period. The suspension was refluxed and stirred for an additional 2 hours. Then, two-thirds of the methanol was permitted to distill off. The remaining slurry was poured into three volumes of water, causing the inorganic salts to dissolve and the organic product to precipitate. The product was filtered, washed with water, and dried in an oven to obtain a substantially theoretical yield of the crude product having elemental analysis and spectroscopic properties for

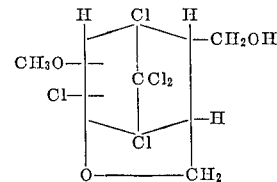

Recrystallization of this crude product from hot carbon tetrachloride yielded a pure product, with a melting point of 157 to 158 degrees centigrade.

Example 2

To 6800 parts of concentrated (97%) sulfuric acid at 93 to 95 degrees centigrade were added with stirring 750 parts of the product of Example 1. The mixture was heated at 95 degrees centigrade for 5 hours and then cooled to room temperature. The solution was poured slowly into cold water with stirring. The precipitated solid was filtered out, washed with water, and dried to obtain a gray solid in 89.5 percent of the theoretical yield. The material, a mixture of isomers, had a melting point in the vicinity of 198 degrees centigrade to 204 degrees centigrade. It had the correct elemental analysis for $C_9H_7O_2Cl_5$. The infrared spectrum shows a strong ether band at 1060 cm$^{-1}$, a ketone carbonyl band at 1785 cm$^{-1}$, and methylene C—H bands at 1480 cm$^{-1}$, and no —OH bands. The structure is therefore believed to be

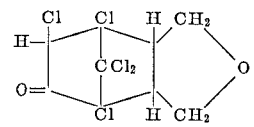

The crude product can be used for the further chlorination.

Example 3

The tricyclic ketone produced in Example 2 was resolved into two isomers by the following procedure. 611 parts of the product of Example 2 were recrystallized from 2000 parts of ethanol. The solids were then recrystallized from carbon tetrachloride to obtain one of the stereoisomers, melting point 196 degrees centigrade to 195 degrees centigrade. This isomer is distinguishable from the other described below by the fact that the former possesses an infrared absorption band at 12.1 $\mu$, whereas the latter possesses, instead, an absorption band at 12.4 $\mu$ (observed in Nujol mull). These isomers of $C_9H_7O_2Cl_5$ are hereinafter designated the "12.1 $\mu$ isomer" and the "12.4 $\mu$ isomer." They are believed to be stereoisomeric at the carbon bearing $X^1$ (=Cl) but it is not intended to be limited by this theory.

The second stereoisomer, the 12.4 $\mu$ isomer was obtained by collecting a second crop of crystals by cooling and partial evaporation of the ethanol mother liquor from the above-described crystallization, and then recrystallizing this substance several times from heptane. This 12.4 $\mu$ isomer has a melting point of about 217–220 degrees centigrade somewhat variable due to decomposition which appears to be promoted by traces of impurities. Both isomers have the correct percentage chloride (54.7%) for $C_9H_7O_2Cl_5$ and exhibit a ketone

in the infrared spectrum and a C—O bond (ether), but no O—H bonds.

*Example 4.—Chlorination of crude $C_9H_7O_2Cl_5$*

A solution of 164 parts of the crude $C_9H_7O_2Cl_5$ of Example 2 in 300 parts of refluxing carbon tetrachloride (80° C.) is exposed to the light from a mercury vapor temperature, and chlorine gas is passed in with stirring. The extent of the chlorination is measured by collecting the evolved hydrogen chloride in water and titrating the hydrochloric acid from time to time.

When 1, 2, 2½, 3, and 4 moles of hydrogen chloride are collected per mole of $C_9H_7O_2Cl_5$ in the system (corresponding to 1, 2, 2½, 3 and 4 Cl introduced per mole), portions of the reaction mixture are removed and evaporated under 15–25. mm. vacuum to remove solvent and dissolved gases. The products are obtained as residues and have the following characteristics:

| n (Cl/mole) | Percent Cl | | Physical Characteristics |
|---|---|---|---|
| | Calculated | Found | |
| 1 | 59.3 | 58.2 | Yellowish-tan semi-solid. |
| 2 | 63.1 | 63.0 | Do. |
| 2.5 | 64.8 | 64.8 | Do. |
| 3 | 66.4 | 66.5 | Do. |
| 4 | 68.2 | 67.5 | Syrup. |

*Example 5*

Under conditions like those of Example 4 the 12.1$\mu$ isomer of $C_9H_7O_2Cl_5$ was chlorinated to introduce two additional chlorine atoms per mole. On evaporation of the solvent, the product was a yellowish syrup which set to a semi-solid cake. By repeated recrystallization from hexane and carbon disulfide, there was obtained a crystalline solid having the correct elemental analysis for $C_9H_5O_2Cl_7$. The absence of methylene group absorption bonds in the infrared spectrum indicates that this compound has the structure

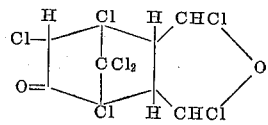

On evaporation the crystallization mother liquors yielded a syrup of the same elemental analysis, indicating other isomers to have been in the crude product.

*Example 6*

Under conditions like those of Example 5, the 12.4$\mu$ isomer was chlorinated to introduce two additional chlorine atoms per mole. The product was a yellowish semi-solid which, on repeated recrystallization from hexane, yielded a crystalline isomer, melting at 129.5–131.5 degrees centigrade and being of the correct elemental analysis for $C_9H_5O_2Cl_7$. The absence of methylene absorption bonds in the infrared spectrum indicates that this compound has the structure

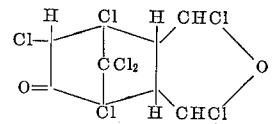

The corresponding bromine analog is prepared by subjecting the chlorinated product of Example 6 to a reaction with hydrogen bromide which results in the product

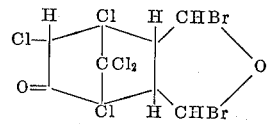

On evaporation the recrystallization mother liquors yielded a syrup of the same elemental analysis, indicating that other isomers were present in the crude in addition to the crystalline isomer.

*Example 7—Emulsifiable formulation*

The following were blended by mixing:

Product of Example 4 ($n$=2) __ 1.25 pounds.
Emulsifier (Emcol H500X, a blended sulfonate-polyoxy-ethylene ether) _____ 0.25 pound.
Xylene _____ to 1 gallon total volume.

This concentrate was emulsifiable with water (about a 5% solution) and the resultant emulsions are sprayed at the rate of 0.1–1 pound of active ingredient per acre onto cabbage plants to obtain satisfactory control of cabbage loopers and aphids.

*Example 8—Granular formulation*

A solution of 1 part of the product of Example 4 (2 Cl/mole) in 1 part of heavy aromatic naphtha was sprayed onto 8 parts of 10–30 mesh attapulgus clay granules while tumbling the granules. There resulted a free-flowing granular solid formulation.

The powdered formulation is applied as a side dressing at the rate of 0.25 pound of insecticide per acre on tomato plants for satisfactory control of lepidopterous larvae.

*Example 9—Dust formulation*

A 5 percent dust formulation was prepared by mixing and grinding five parts of the technical dichlorination product of Example 4 with twenty parts of Microcel E (a synthetic clay-like adsorptive carrier manufactured by Johns-Manville Co.) and the resultant powder was diluted by thoroughly blending with 75 parts of powdered pyrophyllite.

This dust applied to asters at the rate of 0.15 pounds of active ingredient per acre gives excellent control of aphids.

*Example 10—Activity on houseflies*

Adult houseflies (*Musca domestica*) were sprayed with aqueous dispersions of several of the compounds of the invention and with DDT for comparison. The knockdown percentages after two hours were noted and the mortality percentages after 24 hours were recorded. The results are as follows:

| Compound | Conc. (p.p.m.) | 2 hr. Knock-down, Percent | 24 hr. Kill, Percent |
|---|---|---|---|
| 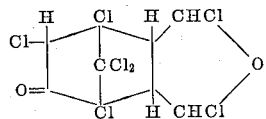 (first structure) | 1,000 | 100 | 100 |
| (second structure) | 2 / 1 / 0.5 / 0.25 | 100 / 30 / 10 / 0 | 100 / 80 / 40 / 0 |
| (third structure, isomer mixture) | 2 / 1 / 0.5 / 0.25 | 100 / 100 / 100 / 50 | 100 / 100 / 100 / 90 |
| (fourth structure, $Cl_{2.5}$) | 2 / 1 | 100 / 100 | 100 / 100 |
| (fifth structure, $Cl_3$) | 2 / 1 / 0.5 / 0.25 | 100 / 70 / 0 / 0 | 100 / 100 / 60 / 10 |
| DDT | 2 / 1 / 0.5 / 0.25 | 0 / 0 / 0 / 0 | 0 / 0 / 0 / 0 |

*Example 11—Activity on southern army worm*

Larvae of the Southern army worm (*Prodenia eridania*) were sprayed with aqueous dispersions of the compounds of the invention. The percentages of kill after 24 hours were noted, the results being as follows:

| Compound | Conc. (p.p.m.) | Percent Kill |
|---|---|---|
| (first structure) | 62 / 31 / 15 / 7 | 60 / 20 / 0 / 0 |
| (second structure, isomer mixture) | 62 / 31 / 15 / 7 | 100 / 100 / 100 / 60 |
| Pure isomer of above, M.P. 130–1° | 15 | 100 |
| Pure isomer of above, M.P. 100–101.5° | 15 | 100 |
| (third structure, $Cl_3$) | 62 / 31 / 15 / 7 | 100 / 100 / 20 / 0 |

*Example 12—Activity on alfalfa weevil*

The compound of the formula

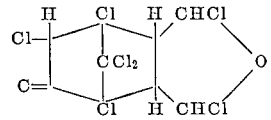

was applied as an emulsifiable concentrate to Narragansett alfalfa two days after harvest, as a first-crop stubble spray for control of alfalfa weevil. The compound was applied at a rate of one pound of toxicant per acre. Larvae sampling was conducted at 10 and 18 days after treatment and gave the following result.

| | Mean number of larvae per 25 sweeps at days after treatment | |
|---|---|---|
| | 10 days | 18 days |
| Test compound, one pound/acre | 0.5 | 1.5 |
| Untreated | 107.5 | 101.8 |

It was further observed that application of the test compound in the autumn, gave 95 percent control of alfalfa weevil through the next year.

*Example 13—Activity on boll weevil*

The compound of the formula (structure shown)

was applied as an aqueous suspension of a 50 weight percent wettable powder and also as a solution of a 1.25 weight percent emulsifiable concentrate to cotton plants for control of boll weevil. The compound was applied in various concentrations and gave the following results.

| | Concentration of Active Ingredient, Weight Percent of Aqueous Medium | | | | |
|---|---|---|---|---|---|
| | 0.5 | 0.25 | 0.4 | 0.05 | 0.01 |
| | Percent Kill | | | | |
| Test Compound as Wettable Powder | 100 | 100 | 90 | 85 | 90 |
| Test Compound as Emulsifiable Concentrate | 100 | 90 | 90 | 100 | 80 |
| Commercial Compound | | 85 | 70 | 68 | |

The compound of Example 13 has also been found useful in the control of European chafer, grasshopper, field cricket, onion maggot, sugar beet maggot, spittle bug and the like.

While this invention has been described with reference to certain specific embodiments, it will be recognized by those skilled in the art that many variations are possible without departing from the spirit and scope of the invention.

What is claimed is:

1. A method for the control of insects which comprises applying to the locus to be treated an insecticidal amount of a compound of the formula

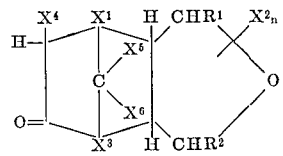

wherein $X^1$, $X^3$, $X^5$, and $X^6$ are selected from the group consisting of hydrogen, halogen, alkyl, alkenyl, halogenated alkyl, and halogenated alkenyl; said alkyl, alkenyl, halogenated alkyl, and halogenated alkenyl containing from 1 to about 18 carbon atoms;

$X^4$ is selected from the group consisting of hydrogen and halogen;

$X^2$ is a halogen atom; $R^1$ and $R^2$ are selected from the group consisting of hydrogen, alkyl of from 1 to about 18 carbon atoms, and halogenated alkyl of from 1 to about 18 carbon atoms;

$n$ is a number from 0 to 4;

at least two of said $X^1$, $X^3$, $X^5$, and $X^6$ substituents being halogen.

2. The method of claim 1 wherein $X^1$, $X^2$, $X^3$, $X^4$, $X^5$ and $X^6$ are halogen, $R^1$ and $R^2$ are hydrogen and $n$ is a number from 0 to 4.

3. The method of claim 1 wherein $X^1$, $X^2$, $X^3$, $X^4$, $X^5$, and $X^6$ are selected from the group consisting of chlorine and bromine; $R^1$ and $R^2$ are hydrogen; and $n$ is a number from 0 to 4.

4. The method of claim 1 wherein the compound has the formula

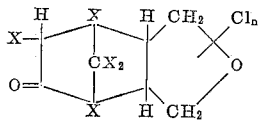

wherein X is a halogen atom and $n$ is a number from 0 to 4.

5. The method of claim 1 wherein the compound has the formula

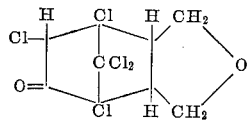

6. The method of claim 1 wherein the compound has the formula

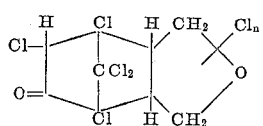

where $n$ is a number from 0 to 4.

7. The method of claim 1 wherein the compound has the formula

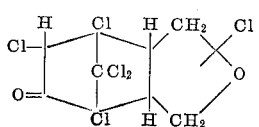

8. The method of claim 1 wherein the compound has the formula

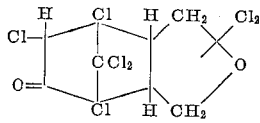

9. The method of claim 1 wherein the compound has the formula

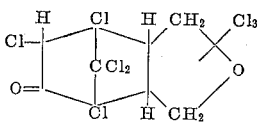

10. The method of claim 1 wherein the compound has the formula

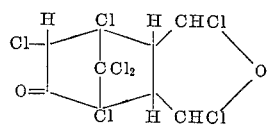

11. An insecticidal composition comprised of an insecticidally effective proportion of the compound of the formula

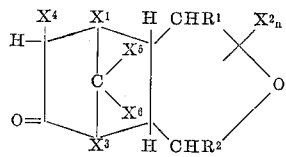

wherein $X^1$, $X^3$, $X^5$, and $X^6$ are selected from the group consisting of hydrogen, halogen, alkyl, alkenyl, halogenated akyl, and halogenated alkenyl, said alkyl, alkenyl, halogenated alkyl, and halogenated alkenyl containing from 1 to about 18 carbon atoms, $X_4$ is selected from the group consisting of hydrogen and halogen, $X^2$ is a halogen atom, $R^1$ and $R^2$ are selected from the group consisting of hydrogen, alkyl of from 1 to about 18 carbon atoms, and halogenated alkyl of from 1 to about 18 carbon atoms, $n$ is a number from 0 to 4, at least two of said $X^1$, $X^3$, $X^5$, and $X^6$ substituents being halogen, together with at least one formulation adjuvant selected from the group consisting of a solvent, a solid carrier, a synergist and a surface active agent.

12. An insecticidal composition according to claim 11 wherein $X^1$, $X^3$, $X^4$, $X^5$ and $X^6$ represent halogen atoms, $X^2$ is chlorine and $R^1$ and $R^2$ are hydrogen.

No references cited.

ALBERT T. MEYERS, *Primary Examiner.*

STANLEY J. FRIEDMAN, *Assistant Examiner.*

UNITED STATES PATENT OFFICE
CERTIFICATE OF CORRECTION

Patent No. 3,322,622                      May 30, 1967

Paul E. Hoch

It is hereby certified that error appears in the above numbered patent requiring correction and that the said Letters Patent should read as corrected below.

Column 3, lines 36 to 40, the left-hand formula should appear as shown below instead of as in the patent:

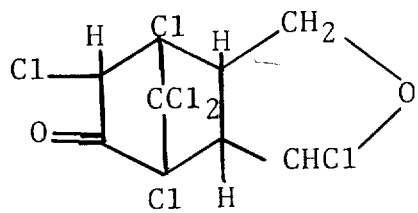

column 4, line 61, for "3, 4, 5" read -- 4, 5, 5 --; column 6, lines 64 to 68, the right-hand formula should appear as shown below instead of as in the patent:

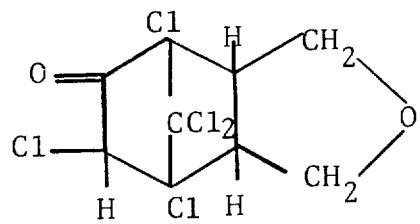

column 9, line 22, for "chloride" read -- chlorine --; column 14, line 35, for "akyl" read -- alkyl --; line 38, for "$X_4$" read -- $X^4$ --

Signed and sealed this 17th day of December 1968.

(SEAL)
Attest:

EDWARD M. FLETCHER, JR.
Attesting Officer

EDWARD J. BRENNER
                                       Commissioner of Patents